US006560277B2

(12) United States Patent
Okunev et al.

(10) Patent No.: US 6,560,277 B2
(45) Date of Patent: May 6, 2003

(54) DISTINGUISHING BETWEEN FINAL CODING OF RECEIVED SIGNALS IN A PCM MODEM

(75) Inventors: Yuri Okunev, Southbury, CT (US); Vitaly Drucker, Stamford, CT (US); Qin Wang, Bristol, CT (US); Yuri Goldstein, Southbury, CT (US)

(73) Assignee: PC Tel, Inc., Milpitas, CA (US)

( * ) Notice: Subject to any disclaimer, the term of this patent is extended or adjusted under 35 U.S.C. 154(b) by 50 days.

(21) Appl. No.: 09/780,200

(22) Filed: Feb. 9, 2001

(65) Prior Publication Data

US 2002/0141493 A1 Oct. 3, 2002

(51) Int. Cl.[7] ............................. H04B 5/16
(52) U.S. Cl. ...................... 375/222; 370/523
(58) Field of Search .................. 375/222, 219, 375/223, 242, 295, 261, 265, 298, 279, 377, 220; 370/523

(56) References Cited

U.S. PATENT DOCUMENTS

| | | | |
|---|---|---|---|
| 5,394,437 A | 2/1995 | Ayanoglu | 375/222 |
| 5,406,583 A | 4/1995 | Dagdeviren | 375/5 |
| 5,528,625 A | 6/1996 | Ayanoglu et al. | 375/222 |
| 5,623,516 A | 4/1997 | Brownlie et al. | 375/259 |
| 5,812,602 A | 9/1998 | Humblet | 375/265 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,862,179 A | 1/1999 | Goldstein et al. | 375/242 |
| 5,862,184 A | 1/1999 | Goldstein et al. | 375/295 |
| 5,875,229 A | 2/1999 | Eyuboglu et al. | 379/1 |
| 5,926,505 A | 7/1999 | Long | 375/222 |
| 5,953,376 A | 9/1999 | Wei | 375/265 |
| 6,178,200 B1 | 1/2001 | Okunev et al. | 375/222 |
| 6,181,737 B1 | 1/2001 | Okunev et al. | 375/222 |
| 6,185,249 B1 * | 2/2001 | Drucker et al. | 375/222 |
| 6,185,250 B1 * | 2/2001 | Wang et al. | 375/222 |
| 6,301,296 B1 * | 10/2001 | Krishnan et al. | 375/222 |
| 6,332,009 B2 * | 12/2001 | Olafsson | 375/358 |
| 6,341,360 B1 * | 1/2002 | Abdelilah et al. | 714/704 |
| 6,421,375 B1 * | 7/2002 | Chu et al. | 370/522 |

FOREIGN PATENT DOCUMENTS

WO   US95/15924   12/1995

OTHER PUBLICATIONS

ITU–T Recommendation V.34 entitled "Data Communication Over the Telephone Network", Sep. 1994, 63 pages.
"The Capacity of PCM Voiceband Channels" by Kalet et al. 1993, IEEE, pp. 507–511.
ITU–Telecommunications Standardization Sector, Draft Recommendation A Digital modem and analogue modem pair for use on the PSTN at Data Signalling rates of up to 56000 bit/s downstream and up to 33600 bit/s upstream V.90, pp 1–50, May 6, 1998.

* cited by examiner

Primary Examiner—Chi Pham
Assistant Examiner—Emmanuel Bayard
(74) Attorney, Agent, or Firm—David P. Gordon; David S. Jacobson; Thomas A. Gallagher

(57) ABSTRACT

A method for determining the encoding law of an incoming signal in a network which possibly contains an A-$\mu$ or $\mu$-A conversion includes obtaining digital impairment learning (DIL) probing data, generating an ordered table of levels therefrom, using the table to find two functions, and using a logical analysis of the functions to determine the encoding law of the signal. A first function is a maximum from the values $DL(i)$ and the threshold $Th1$ which are less than $T(i)$, with $T(i)=a+bi$, and $DL(i)=L(i+16)-2L(i)$ with $L(i)$ being the DIL signal corresponding to the transmitted Ucode=i. A second function Q is defined by:

$$Q = \frac{1}{2}\left(\sum_{i=i5}^{i=i6} DL(i) + \sum_{i=i5}^{i=i6} DLm(i)\right) - S_m \frac{Ly^2}{2}$$

where $DLm(i)$ is the median value of a windowed group of values for $DL(i)$ where $i$ ranges from $i5$ to $i6$, $Ly=i6-i5-1$, and $S_m$ is a mean of a windowed group of slopes, wherein each slope relates to the difference between certain $DLm(i)$ values.

22 Claims, 8 Drawing Sheets

| Ucode Tx OR Ucode Rx WITHOUT CONVERSION | Ucode Rx AFTER A-μ CONVERSION | Ucode Rx AFTER μ-A CONVERSION |
|---|---|---|
| 0 | 1 | 0 |
| 1 | 3 | 0 |
| 2 | 5 | 1 |
| 3 | 7 | 1 |
| 4 | 9 | 2 |
| 5 | 11 | 2 |
| 6 | 13 | 3 |
| 7 | 15 | 3 |
| 8 | 16 | 4 |
| 9 | 17 | 4 |
| 10 | 18 | 5 |
| 11 | 19 | 5 |
| 12 | 20 | 6 |
| 13 | 21 | 6 |
| 14 | 22 | 7 |
| 15 | 23 | 7 |
| 16 | 24 | 8 |
| 17 | 25 | 9 |
| 37 | 41 | 33 |
| 38 | 42 | 34 |
| 39 | 43 | 35 |
| 40 | 44 | 36 |
| 41 | 45 | 37 |
| 42 | 46 | 38 |
| 43 | 47 | 39 |
| 44 | 48 | 40 |
| 45 | 48 | 41 |
| 46 | 49 | 42 |
| 47 | 49 | 43 |
| 48 | 50 | 45 |
| 49 | 51 | 47 |
| 50 | 52 | 48 |
| 51 | 53 | 49 |
| 52 | 54 | 50 |
| 53 | 55 | 51 |
| 54 | 56 | 52 |
| 55 | 57 | 53 |
| 56 | 58 | 54 |
| 57 | 59 | 55 |
| 58 | 60 | 56 |

FIG.2A

| FIG.2A |
|---|
| FIG.2B |

DISTINGUISHING BETWEEN FINAL CODING OF RECEIVED SIGNALS IN A PCM MODEM

The present invention is related to co-owned U.S. Ser. No. 08/801,066 now issued as U.S. Pat. No. 5,822,371, U.S. Ser. No. 08/807,955 filed Mar. 4, 1997, U.S. Ser. No. 08/838,367 filed Apr. 8, 1997, U.S. Ser. No. 08/851,597 now issued as U.S. Pat. No. 5,825,816, U.S. Ser. No. 08/870,684 now issued as U.S. Pat. No. 5,825,823, U.S. Ser. Nos. 09/238,319, 09/238,320, 09/238,321, and 09/238,302 all filed on Jan. 28, 1999, and U.S. Ser. No. 09/315,475 filed on May 20, 1999, all of which are hereby incorporated by reference herein in their entireties.

BACKGROUND OF THE INVENTION

1. Field of the Invention

The present invention relates to data communications equipment. More particularly, the present invention relates to methods for distinguishing different types of signals received by a PCM modem.

2. State of the Art

With the ever-increasing importance of telecommunications for the transfer of data as well as voice, there has been a strong effort to increase data transfer rates over the telephone wires. In 1994, the ITU-T adopted the V.34 Recommendation (International Telecommunication Union, Telecommunication Standardization Sector Recommendation V.34, Geneva, Switzerland 1994). The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, even as the V.34 standard was being adopted, there was a thrust to provide additional standards recommendations which would increase data transfer rates even further.

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation.

The primary difference between the AT&T technology and the Townshend reference is that the AT&T technology suggests exploiting the digital aspect of the telephone network in both "upstream" and "downstream" directions, while Townshend appears to be concerned with the downstream-direction only.

Recently, a new Recommendation for standard was adopted by the ITU-T for the purposes of standardizing a PCM-type modem. The new standard, known as "V.90", which is hereby incorporated by reference herein in its entirety, relates primarily to the transmitter of a PCM-type modem, and relates to a modem which exploits the digital aspect of the telephone network in the downstream direction only. The ITU-T has also recently approved an additional standard known as "V.92" which relates to a modem which exploits the digital aspect of the telephone network in both the upstream and downstream directions.

In Section 8.4.1, the V.90 Standard requires the provision of a probing signal; also known in the art as digital impairment learning or "DIL". The purpose of the DIL is to give the receiver of the receiving (analog) modem the opportunity to measure network impairments. The measurements and determinations made by the receiving modem are used by the receiving modem in formulating an appropriate constellation for the transfer of data. The constellation formulated by the receiving modem is transmitted back to the transmitting modem according to the format set forth in Section 8.5.2 of the V.90 standard.

While much attention has been paid in the prior art to the transmitters in the V.90 and V.92 modems, it will be appreciated that ability to design an appropriate transmission constellation plays a critical role in producing a high quality modem. In particular, according to V.90, the transmitter transmits 8-bit binary numbers (octets) which correspond to 128 positive and 128 negative $\mu$-law or A-law levels. These octets go through the digital network and are finally transformed into analog levels in a digital-to-analog (D/A) converter in the central office. To maximize data rates in the presence of network impairments, an optimal signal constellation must be utilized. Thus, it is necessary to relate (correspond) the transmitted octets to the levels received at the D/A output. This relation or correspondence is accomplished by reference to a translation table. Determination of the translation table is not a trivial task because the digital channel has uncertain parameters and the PCM signal is subjected to both digital and analog distortions including digital attenuation (PAD), robbed bits, etc. However, preparation of an appropriate translation table is critical to the high-quality functioning of the data communications. In addition, the translation table is necessary for generating an appropriate constellation design.

As set forth in previously incorporated Ser. No. 09/238, 319, an important step in generating a translation table and constellation design is a determination as to whether the signal being received is an A-law signal or a $\mu$-law signal. Some countries (particularly European) utilize A-law encoding in their phone networks, and others (e.g., Japan and the U.S.) use $\mu$-law encoding. A few countries (such as South Korea) implement both A-law and $\mu$-law encoding in their networks.

As a rule, phone networks have only either A-law encoding or $\mu$-law encoding for most domestic calls. However, it is possible that the network between a client modem and a server modem may link the A-law and $\mu$-law networks when some domestic or international calls are placed. As a result, the client modem can receive any of four types of signals: a pure µ-law signal, a µ-law signal which is the result of an A-µconversion, a pure A-law signal, or an A-law signal which is the result of a µ-A conversion. In establishing a channel, it is critical that the receiving modem determine whether the signals it is ultimately receiving are A-law (either pure or the result of a µ-A conversion) or µ-law (either pure or the result of an A-µ conversion).

The technology set forth in previously incorporated Ser. No. 09/238,319 is effective and capable of distinguishing between a pure µ-law signal and a pure A-law signal. In particular, in previously incorporated Ser. No. 09/238,319 a separation function was introduced:

$$F1(n1, n2) = \sum_{i=n1}^{i=n2} \{L(i) - 2^y * [L(i - 16y)]\},$$

where L(i) is the i-th positive received level corresponding to transmitted Ucode=i, and y is a positive integer preferably equal to one. For pure A-law levels without noise (and with respect any PAD attenuation), for any n2>n1≧33, F1(n1,n2) will be zero. On the other hand, for pure µ-law levels without noise and with 0 dB PAD attenuation, F1(n1,n2)=33(n2−n1+1). According to the preferred embodiment of Ser. No. 09/238,319, the value for the separation function is calculated for any non-robbed-bit signal within the frame, or for the average of non-robbed-bit signals. Then, the value for the separation function is compared to a threshold (e.g., five hundred). If the value of the separation function exceeds the threshold, the signal is determined to be a µ-law signal. Conversely, if the value of the separation function does not exceed the threshold, the signal is determined to be an A-law signal.

While pure A-law and pure µ-law signals are distinguished by the separation function of Ser. No. 09/238,319, in some circumstances, the separation function is not as effective in distinguishing the results of an A-µ conversion and a µ-A conversion. In particular, values, at PAD=0 of the function DL(i)=L(i+16)−2L(i) for pure A, pure µ, A-µ conversion, and µ-A conversion are seen in FIG. 1. As will be appreciated, the values for the A-µ and µ-A conversions will not permit effective use of the recited separation function, as the calculated value for the separation function F1(n1,n2) for the A-µ conversion can result in values well below the given threshold and result in an improper determination of A-law encoding, while, conversely, the calculated value for the separation function F1(n1,n2) for the µ-A conversion can result in values well above the given threshold and result in an improper determination of µ-law encoding. These results are caused by the difference between the conversion tables for the µ-law and the A-µ-law network as well as by the difference between the conversion tables for the A-law network and the µ-A-law network. The µ-A and A-µ conversions are given in Tables 3 and 4 of the ITU-T G.711 Recommendation. Based on these tables, a table listing Ucodes sent and Ucodes received after µ-A and A-µ conversions can be generated as seen in FIG. 2. As can be seen in FIG. 2, each of the conversions result in some Ucodes not being received, and other Ucodes being duplicated. Ucodes from 81 to 127 are not listed in the table, as the received Ucodes for both columns are equal to the transmitted Ucode.

While tables such as shown in FIG. 2 might be generated for specific PAD attenuations and usable to find the encoding law by means of comparing the received and scaled DIL with the set of transformation tables, such an approach is time consuming and is not particularly reliable in the presence of certain levels of intermodulation distortion (IMD), noise, and other channel impairments. In addition, such an approach is not advisable when a wide range of possible PAD attenuations are considered.

SUMMARY OF THE INVENTION

It is therefore an object of the invention to provide methods for determining whether a signal being received at a modem is an A-law or µ-law coded signal.

It is another object of the invention to provide methods for distinguishing among pure µ-law signals, µ-law signals which are the result of A-µ conversion, pure A-law signals, and A-law signals which are the result of a µ-A conversion.

It is a further object of the invention to provide methods for determining the encoding law of a received signal based solely on collected DIL probing data received by a PCM type modem.

In accord with the objects of the invention, a method for determining the encoding law of an incoming signal generally includes obtaining DIL probing data, generating an ordered table of levels therefrom, using the ordered table of levels to find two functions, and using the two functions to determine the encoding law of the incoming signal.

According to a preferred embodiment of the invention, a first of the two functions (the "Z" function) is a maximum from the values DL(i) and Th1 which are less than T(i), where Th1 is a threshold value, T(i) is a linear function of the Ucode=i (T(i)=a+bi), and DL(i)=L(i+16)−2L(i) with L(i) being the DIL signal corresponding to the transmitted Ucode=i. Preferably, for the Z function, i is chosen from Ucode=80 to Ucode=100, so that there are twenty-one DL(i) values, and the maximum value of the twenty-one DL(i) values which is less than T(i) for that value is chosen as the Z function value. If all DL(i) values are larger than T(i), then the threshold Th1 is taken as the Z function value.

According to the preferred embodiment of the invention, the second of the two functions (the "Q" function) is defined by:

$$Q = \frac{1}{2}\left(\sum_{i=i5}^{i=i6} DL(i) + \sum_{i=i5}^{i=i6} DLm(i)\right) - S_m \frac{Ly^2}{2}$$

where DLm(i) is the median value of a windowed group of values for DL(i) where i ranges from i5 to i6, Ly=i6−i5−1, and $S_m$ is a mean of a windowed group of slopes, wherein each slope relates to the difference between certain DLm(i) values. Preferably, for the Q function, i5 is chosen to equal 65 and i6 is chosen to equal 80. The Q function is substantially independent of IMD and represents a summation.

The Q and Z functions are used in the preferred embodiment of the invention to determine the encoding law according to a logical analysis. If Z is greater than a certain threshold Th2, the final encoding is µ-law encoding. If Z is less than or equal to Th2, then Q is compared to a third threshold Th3. If Q is greater than or equal to Th3, the final encoding is A-law encoding. However, if Q is less than Th3, Z is then compared to the first threshold Th1. If Z is greater than the first threshold Th1, then the final encoding is µ-law encoding. If not, Q is compared to a fourth threshold Th4. If Q is less than a fourth threshold then the final encoding is µ-law encoding. Otherwise, Q is compared to a fifth threshold Th5. If Q is greater than a fifth threshold Th5 then the final encoding is µ-law encoding. Otherwise, the final encoding is A-law encoding. According to the preferred embodiment, the various thresholds are set at: Th2=−100, Th3=820, Th4=−200, and Th5=250.

Additional objects and advantages of the invention will become apparent to those skilled in the art upon reference to the detailed description taken in conjunction with the provided figures.

BRIEF DESCRIPTION OF THE DRAWINGS

Figure 2B:
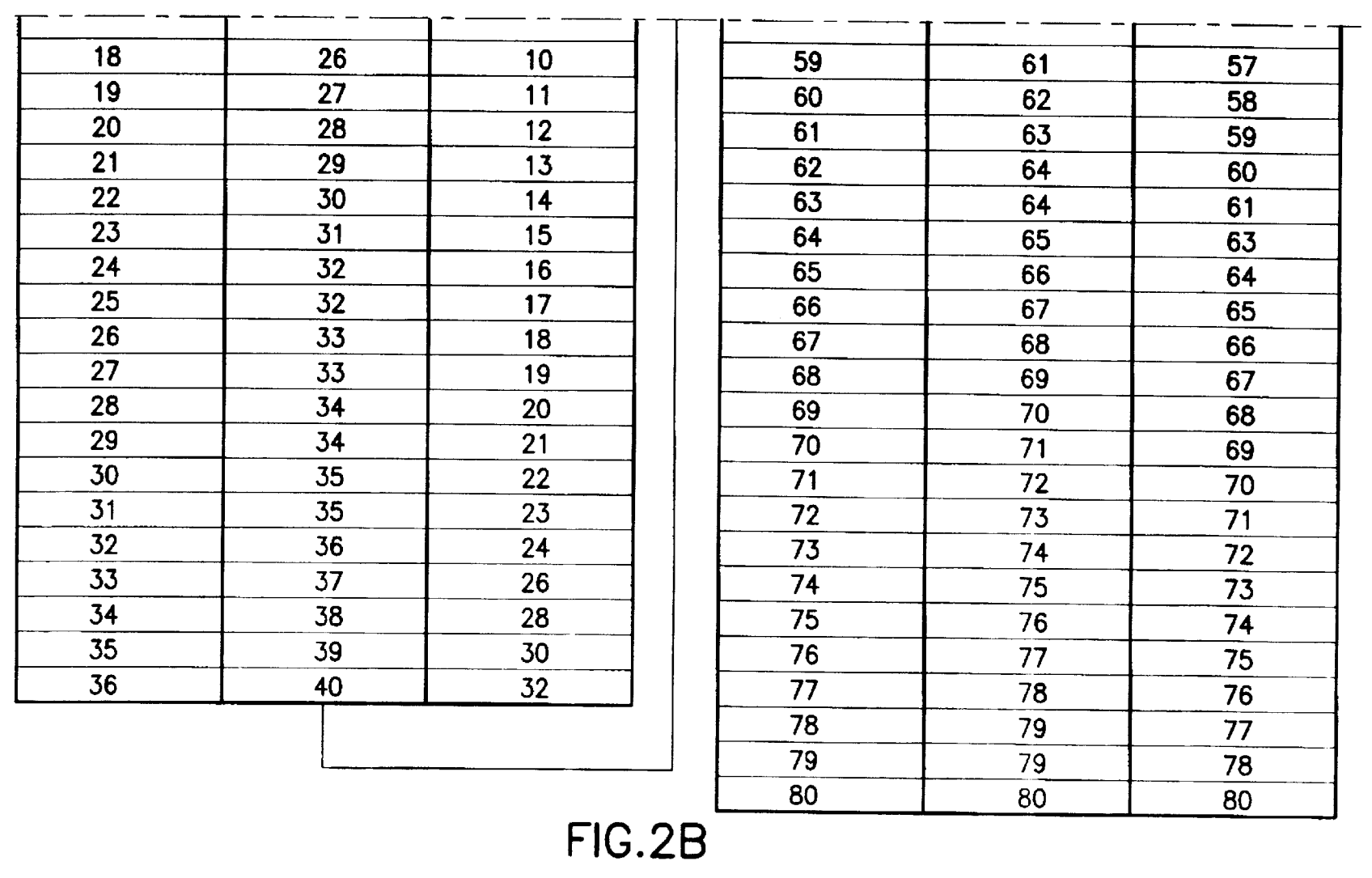

FIG. 2 is a table listing Ucodes sent, and Ucodes received after $\mu$-A and A-$\mu$ conversions.

DETAILED DESCRIPTION OF THE PREFERRED EMBODIMENTS

Figure 1:
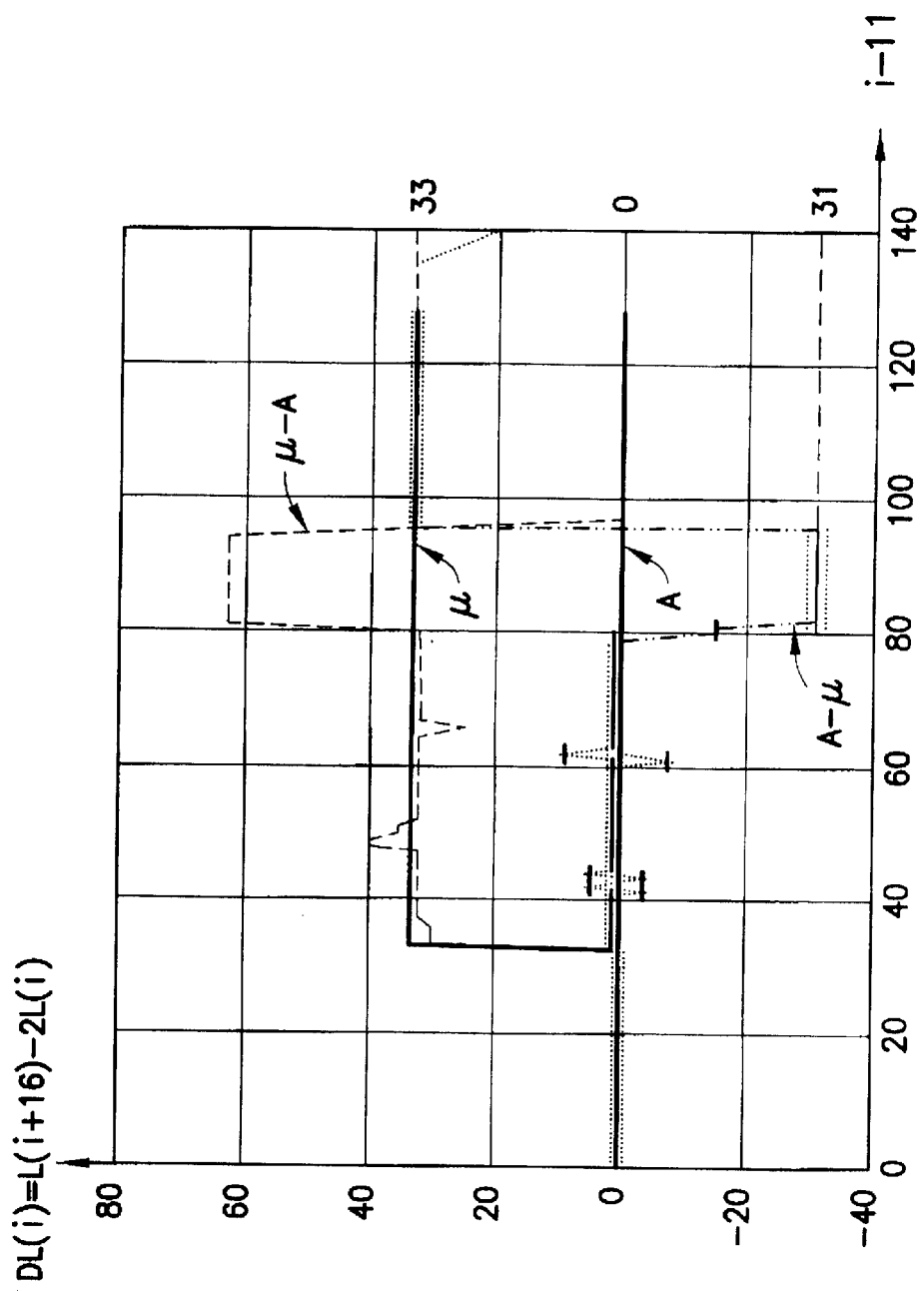
FIG. 1 is a graph of a function of received Ucode values at a 0 dB PAD for pure A-law, pure $\mu$-law, A-$\mu$ conversion, and $\mu$-A conversion.
Figure 3A:
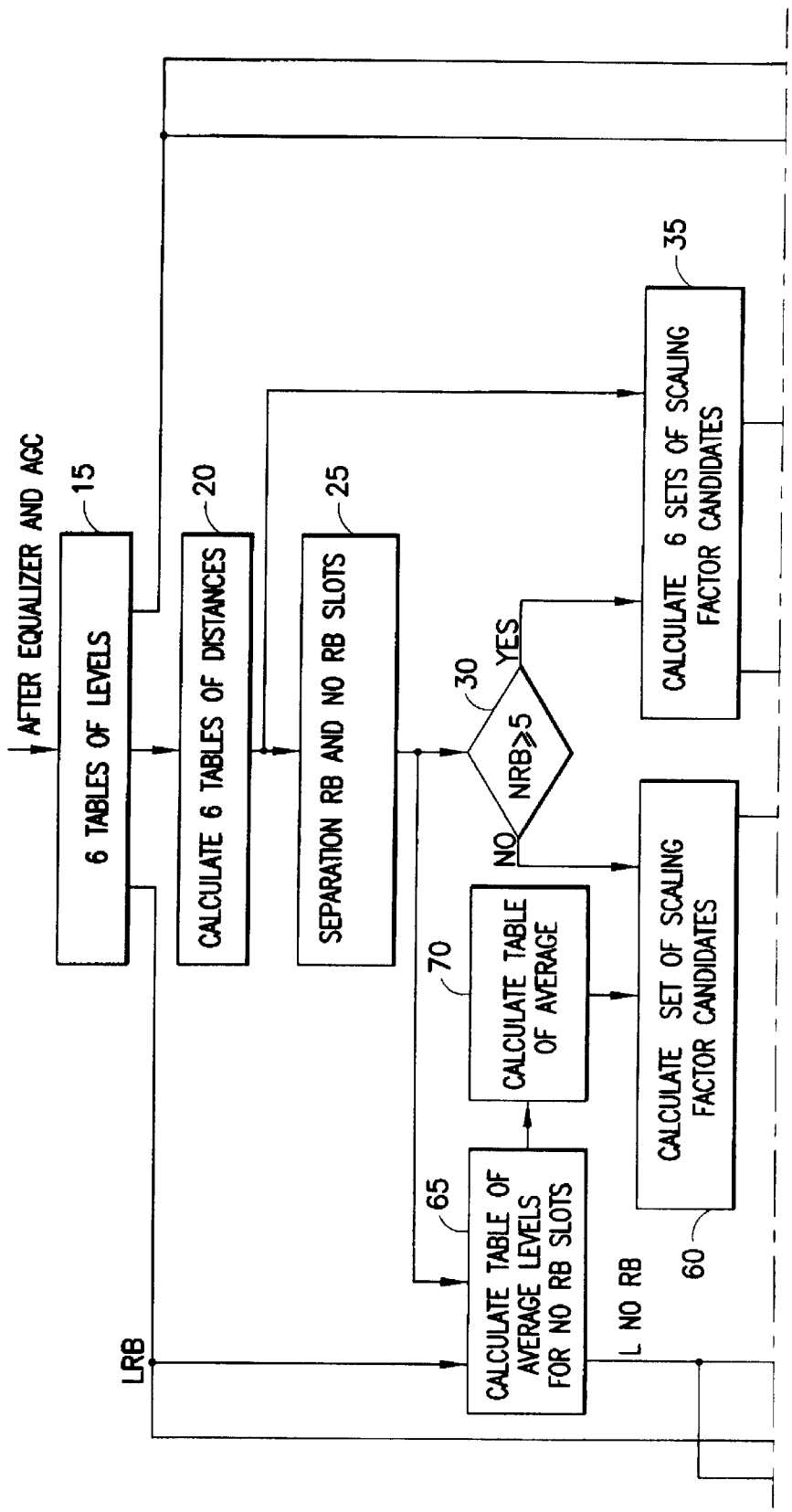
FIGS. 3A and 3B together constitute a flow-chart of a method of generating translation tables according to the invention.
Figure 3B:
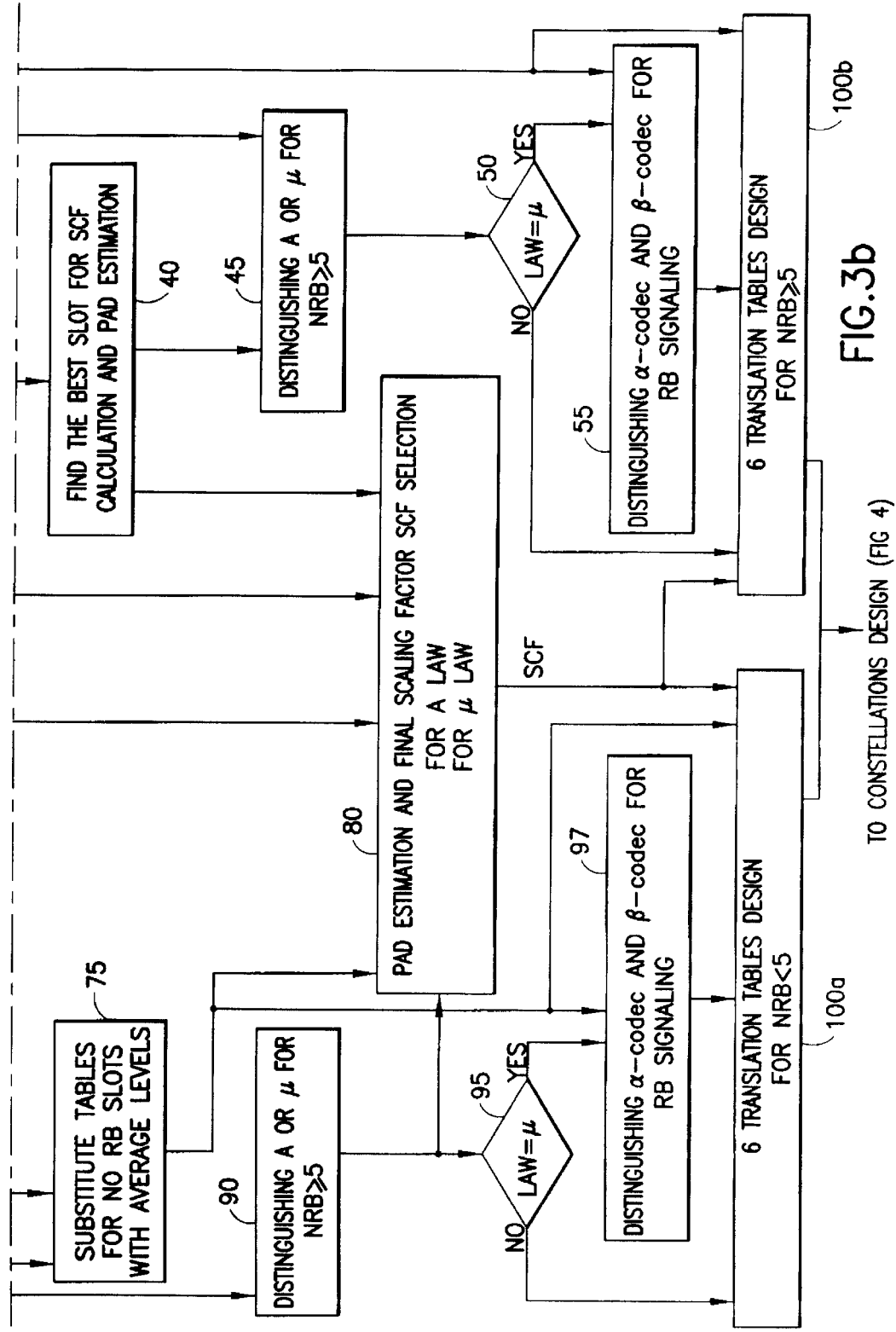

The context of the present invention is best understood by turning to FIGS. 3A and 3B where a method for generating translation tables is shown in accord with previously incorporated Ser. No. 09/238,319. It will be appreciated that all the methods of the invention may be carried out utilizing one or more of hardware, firmware or software (typically involving one or more of microprocessors, DSPs, and memory). The incoming signal is assumed to be a DIL probing signal which has been equalized and subject to automatic gain control (AGC). At 15, the DIL signal is separated slot by slot (typically six slots) into tables which are preferably ordered and stored. At 20, tables of distances between the levels are calculated and stored. Thus, where all one hundred twenty-eight values are sent and stored for a slot in a table at step 15, one hundred twenty-seven distances would be calculated for that slot and stored in a table at step 20. Based on the distances, a determination is made at 25 as to whether the slot has been subjected to robbed bits or not.

At 30 a determination is made as to the number of slots which are subject to robbed bit signaling. If the number of robbed bit slots is five or six (i.e., there is only one or zero non-robbed bit slots), at 35 six sets of candidate scaling factors Scf are calculated (one set for each of the six slots). The six sets of candidate scaling factors are provided as one input to the PAD estimation and final scaling factor selection at 80. In addition, at 40, the slot having the largest number of "typical" points is chosen. The distances calculated at step 20 for that slot are then used in a determination made at step 45 as to whether A-law or $\mu$-law is being utilized (as discussed below with reference to FIGS. 5 and 6) and that determination is provided to the PAD estimation and final scaling factor selection step 80. Where A-law is being utilized, at step 50, that fact is forwarded to step 100b where the translation tables are designed. If $\mu$-law is being utilized, a determination is made, at 55 (and utilizing the tables stored at 15) as to whether robbed bit or half robbed bit signaling is being utilized in each slot. The results are forwarded to the translation table design step 100b, as are the six tables of levels stored at step 15.

Returning to step 40, the slot chosen as having the largest number of typical distances (typically a non-robbed bit slot) is used in a PAD-estimation algorithm in determining the likely PAD impairment of the channel and in determining a final scaling factor at 80. The result of that determination is provided to the translation table design step 100b (as well as translation table design step 100a). As seen in FIG. 3B, the translation table design conducted at 100b also utilizes the tables determined at 15, the A-law/$\mu$-law determination of step 50, and the robbed-bit/half-robbed-bit determination of step 55.

Returning to step 30, when it is determined that fewer than five slots are subjected to robbed bit signaling, then candidate average scaling factors are calculated at 60 and the candidate average scaling factors are forwarded to step 80. As seen in FIGS. 3A and 3B, in calculating the average scaling factor, certain information is required. Thus, at 65, using information from step 25 as to which slots are not subject to robbed bit signaling, and the tables of levels for those slots (from step 15), a table of average levels for the non-robbed-bit slots is calculated. Using the average levels calculated at 65, a table of distances between the average levels is calculated at 70. The table of distance between average levels is utilized at 60 in calculating an average scaling factor. The table of average levels for the non-robbed-bit slots calculated at 65 is also utilized at step 75. In particular, at step 75, a new set of six tables of levels is stored, where for each non-robbed-bit slot, the table stored for that slot at step 15 is utilized; and where for each robbed-bit slot, the table of average levels calculated at step 65 is utilized in lieu of the table stored at step 15. These tables are utilized in the PAD estimation and final scaling factor selection step 80.

The table of average levels for non-robbed-bit slots calculated at 65 and used in generating the set of six tables at step 75, is also utilized in the algorithm at step 90 in distinguishing whether A-law or $\mu$-law is being utilized. The determination of step 90 is provided to the PAD estimation and final scaling factor selection step 80. In addition, where A-law is being utilized, at step 95, that fact is forwarded to step 100a where the translation tables are designed. If $\mu$-law is being utilized, a determination is made at 97 (and utilizing the tables stored at 75) as to whether robbed bit or half robbed bit signaling is being utilized in each slot. The results are forwarded to the translation table design step 100a, as are the six tables of levels stored at step 75.

Figure 4:
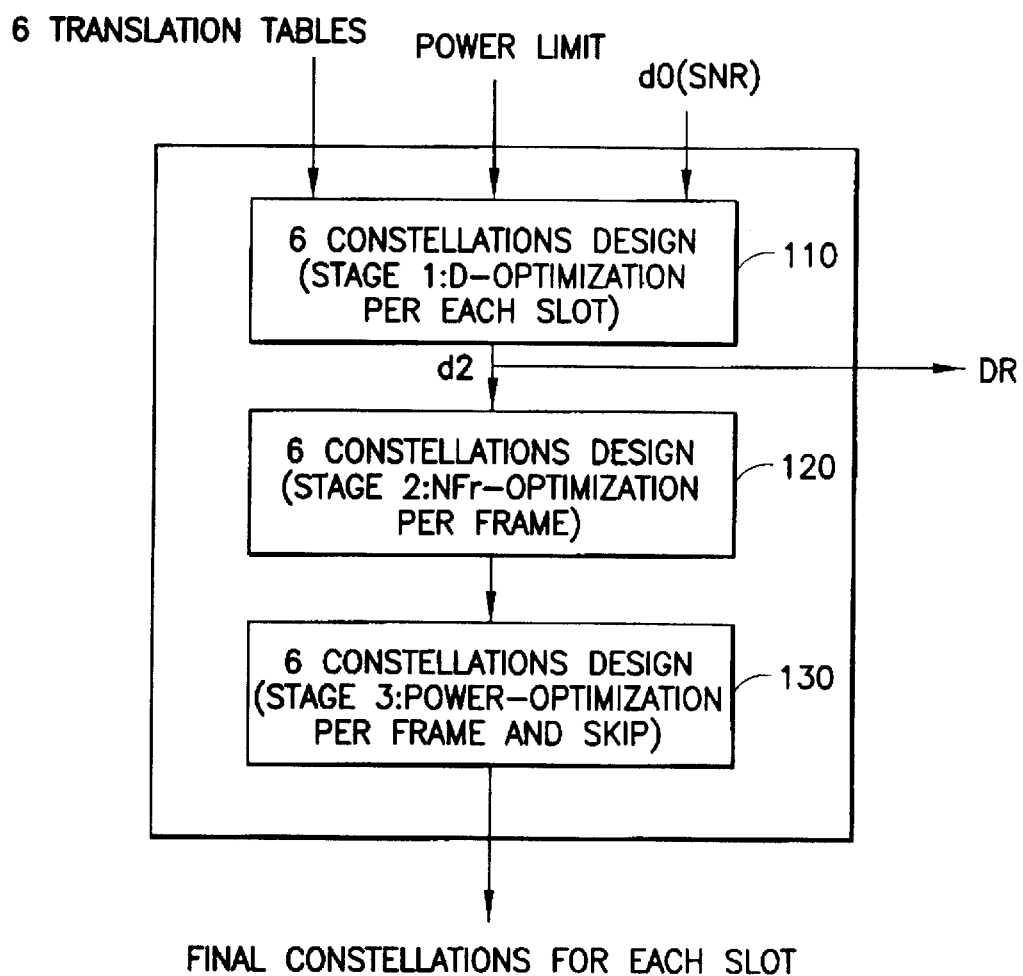
FIG. 4 is a flow chart of the method of designing appropriate constellations for utilizing the translation tables of FIGS. 3A and 3B according to the invention.

As seen in FIG. 4, the translation tables generated at 100a or 100b are utilized in the design of a constellation. More particularly, the six translation tables, a power limit, and the minimum distance (d0) between received constellation points are provided to a first stage 110 of the constellation design. First stage 110 is designed to optimize, independently for each slot, the distances between constellation points used for that slot. The output of the first stage 110 is provided to a second stage 120 which is designed to optimize distances for the whole frame (the sequence of six slots) under power limitations for each slot independently. The output of the second stage is provided to a third stage 130 which is designed to optimize the power of the six constellations for the whole frame.

Additional details of the context of the invention as discussed with reference to FIGS. 3A, 3B and 4 may be obtained with reference to previously incorporated U.S. Ser. No. 09/238,319.

Figure 5:
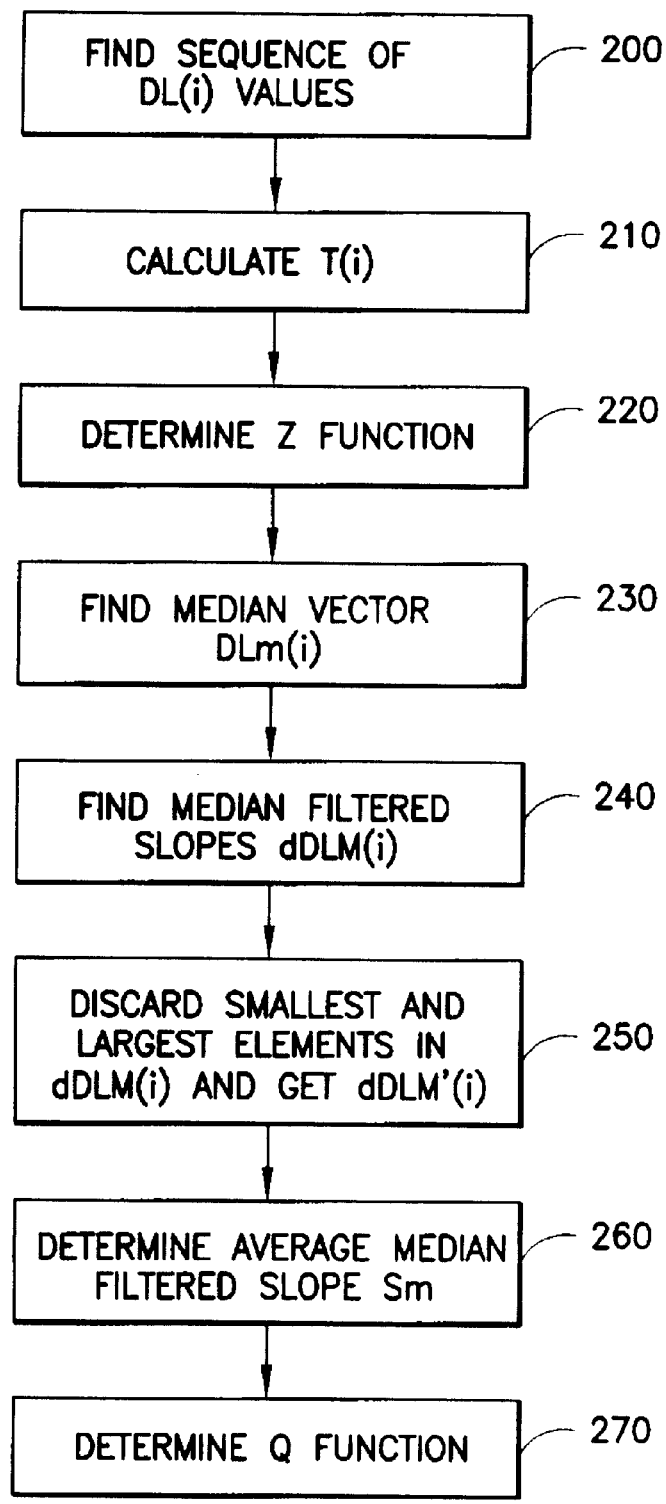
FIG. 5 is a flow chart of the method of the invention for finding the functions Q and Z used to determine the encoding law of the incoming signal.

Turning now to FIG. 5, the preferred method of the invention for determining the encoding law of an incoming signal is seen. Using the ordered table of average levels from FIG. 4A, two functions Q and Z are determined. In particular, at 200, using the ordered table of average levels, a sequence of difference values DL(i) are found according to: DL(i)=L(i+16)−2L(i), with L(i) being the average level DIL signal corresponding to the transmitted Ucode=i, and with i ranging from a first value i1 to a second value i2. In the preferred embodiment of the invention, i1 is chosen to be equal to 80, and i2 equal to 100. At 210, a linear function T(i) is calculated according to: T(i)=a+b(i), with i ranging from i1 to i2. In the preferred embodiment of the invention a is chosen to be equal to 65, and b is chosen to be equal to −12. Thus, T(i) is preferably a monotonically decreasing function of the Ucode.

According to a preferred embodiment of the invention, at step 220, the Z function is determined by taking a maximum from the values DL(i) and Th1 which are less than T(i), for i ranging from i3 to i4, where Th1 is a threshold value, where DL(i) is taken from step 200, and where T(i) is taken from step 210. In the preferred embodiment of the invention, i3 and i4 are chosen to equal 80 and 100, and Th1 is set equal to −32767 (i.e., 1−$2^{15}$). Thus, at step 220, starting with i=80, the DL(i) value calculated at step 200 is compared to the T(i) value calculated at step 210. If DL(i) is less than T(i) for any i value from i3 to i4, that DL(i) value is considered a candidate Z function value and stored. After all candidate DL(i) values are found, the largest candidate is chosen as the Z function value provided it is greater than Th1 (which it always is). However, if no candidate values are found because all DL(i) values are greater than T(i), the threshold value Th1 is used as the Z function value.

At steps 230–270, the Q function is determined. In accord with the invention, a local slope value can be determined by taking the difference between adjacent DL(i) values. An average slope can preferably be taken by ordering the local slope values, discarding smallest and largest values, and averaging the remaining values. Since the DL(i) data are spiky even in the absence of loop noise due to digital PAD and/or encoding law conversion in the network, according to the preferred embodiment of the invention, a median filter with window W is applied to obtain a smoothly averaged level vector DLm(i). Specifically, and at step 230, for a preferred i value range of i5=65 and i6=80, a sixteen element vector DLm(i) is found by taking the median value of the DL(i) values in a window (e.g., W=5). Thus for DL(65), the value DLm(65) is the middle value of DL(63), DL(64), DL(65), DL(66), and DL(67) after they are sorted. At step 240, the median filtered slopes are found according to dDLm(i)=DLm(i)−DLm(i−1), with i ranging from i5 to i6, and at step 250, the median filtered slopes are optionally sorted, and the smallest and largest median filtered slopes discarded to provide a modified vector dDLm'(i). The averaged median filtered slope $S_m$ is defined at step 260 as the mean (average) of the fourteen slopes in the dDLm'(i) vector. Then at step 270, the Q function is determined according to:

$$Q = \frac{1}{2}\left(\sum_{i=i5}^{i=i6} DL(i) + \sum_{i=i5}^{i=i6} DLm(i)\right) - S_m \frac{Ly^2}{2}$$

where DLm(i) is taken from step 230, Ly=i6−i5−1, and $S_m$ is taken from step 260.

Figure 6:
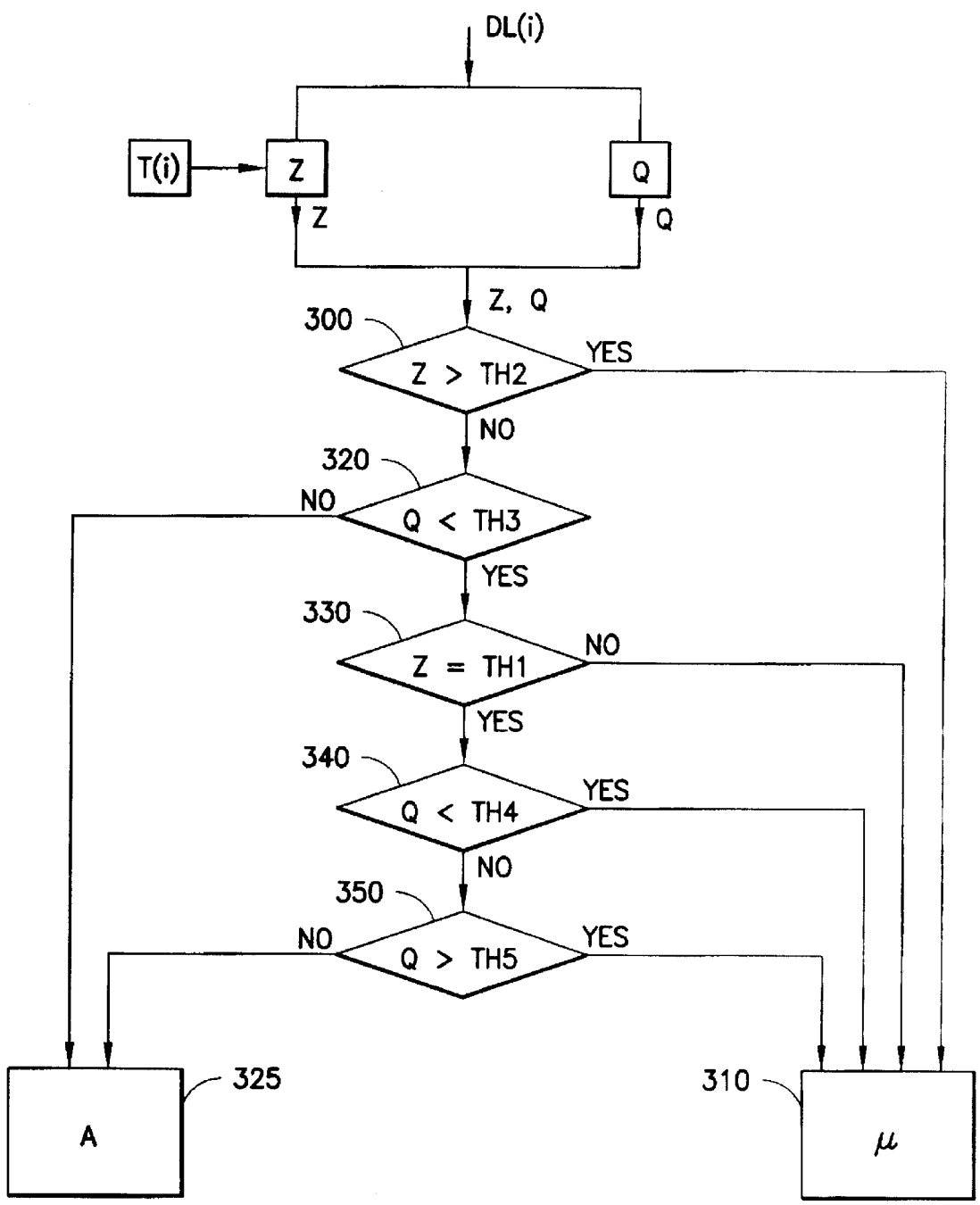
FIG. 6 is a flow chart of the logic used to determine the encoding law based on the values of functions Q and Z.

Turning now to FIG. 6, a flow chart of the logic used to determine the encoding law based on the values of functions Q and Z is seen. At 300, Z is compared to a second threshold Th2, which in the preferred embodiment of the invention is set equal to −100. If Z is greater than or equal Th2, then at 310, the final encoding is determined to be μ-law encoding.

If Z is less than Th2, then at 320, Q is compared to a third threshold Th3 (with Th3 preferably equal to 820). If Q is greater than or equal to Th3 (i.e., not less than Th3), then at 325, the final encoding is determined to be A-law encoding. If Q is less than Th3, at 330, Z is compared to the first threshold Th1 which equals −32767 according to the preferred embodiment of the invention. If Z is greater than Th1 (i.e., Z does not equal Th1), then the final encoding is μ-law encoding. But, if Z equals Th1, then at 340, Q is compared to a fourth threshold Th4, which in the preferred embodiment of the invention equals −200. If Q is less than Th4, then the final encoding is determined to be μ-law encoding. However, if Q is greater than or equal to Th4, then at 350, Q is compared to a fifth threshold Th5. If Q is greater than Th5, then the final encoding is μ-law encoding. Otherwise, the final encoding is A-law encoding.

The determination of the Q and Z functions and the logic used on conjunction with those functions has been found to reliably distinguish the network encoding law at the local central office regardless of whether μ-A law conversion or A-μ law conversion was previously conducted. Since the encoding law status in the server modem is transmitted to a client modem according to a V.92 specification, the whole network encoding law transformation can be determined in the client modem.

There has been described and illustrated herein methods for distinguishing different types of signals received by a PCM modem. While particular embodiments of the invention have been described, it is not intended that the invention be limited thereto, as it is intended that the invention be as broad in scope as the art will allow and that the specification be read likewise. Thus, while particular "Q" and "Z" functions were described, it will be appreciated by those skilled in the art that other such functions could be utilized, provided that the two (or more) functions can be used to distinguish different encoding schemes. In addition, while the Q and Z functions were determined with respect to particular "i" ranges, it will be appreciated that other ranges could be utilized. Similarly, while the functions were determined with respect to certain particular threshold values, it will be appreciated that other threshold values could be utilized. Likewise, while the Q function was determined with respect to certain median windowed values (DLm(i) and $S_m$), it will be appreciated that other windows could be utilized. Further, while a particular flow chart was provided with respect to the Q and Z values and the thresholds Th1–Th5 in order to determine the last encoding utilized, it will be appreciated that the methods of the invention can be described with other flow charts. It will therefore be appreciated by those skilled in the art that yet other modifications could be made to the provided invention without deviating from its spirit and scope as so claimed.

We claim:

1. A method in a modem having a frame having a plurality of slots, comprising:
    a) obtaining DIL sequence information from another modem;
    b) from said DIL sequence information, generating at least one ordered table of levels;
    c) using said ordered table of levels to find at least two functions; and
    d) using said at least two functions to determine whether said DIL sequence information was last encoded according to A-law or μ-law encoding.

2. A method according to claim 1, wherein:
    said using said ordered table of levels comprises, for information relating to at least one of said plurality of slots, comparing a first plurality of levels of said at least one ordered table of levels with a function of a second plurality of respective levels which are removed from said first plurality of levels, and using comparisons obtained from said comparing, finding values of at least two additional functions which together are capable of distinguishing whether said DIL sequence information was last encoded according to A-law or $\mu$-law encoding.

3. A method according to claim 2, wherein:

said second plurality of respective levels are removed from said first plurality of levels by 16y where y is an integer.

4. A method according to claim 3, wherein:

said function of said second plurality of levels is a multiplication by $2^y$ of said second plurality of levels 16y levels removed.

5. A method according to claim 4, wherein:

y equals one.

6. A method according to claim 2, wherein:

said comparing comprises finding a sequence of difference values DL(i) according to DL(i)=L(i+16) −2L(i), with L(i) being an average level DIL signal corresponding to a transmitted Ucode=i.

7. A method according to claim 6, wherein:

said finding values of at least two additional functions comprises finding a first (Z) of said at least two additional functions by taking a maximum from the values DL(i) and a first threshold value (Th1) which are less than T(i), where T(i) is a function of i.

8. A method according to claim 7, wherein:

said DL(i) and said T(i) are taken over a first range of i values.

9. A method according to claim 8, wherein:

said first range is from i equals approximately 80 to i equals approximately 100.

10. A method according to claim 8, wherein:

said function T(i) equals a+bi where a and b are integers, and b is a negative integer.

11. A method according to claim 10, wherein:

a equals approximately 65 and b equals approximately −12.

12. A method according to claim 11, wherein:

said first range is from i equals approximately 80 to i equals approximately 100, and said first threshold value Th1 is equal to approximately −32767.

13. A method according to claim 6, wherein:

said finding values of at least two additional functions comprises finding a second (Q) of said two additional functions by determining for a second range of i values a plurality of windowed median values of the DL(i) values (DLm(i)) and calculating said Q function as a function of said DL(i) values and said DLm(i) values.

14. A method according to claim 13, wherein:

said plurality of windowed median values DLm(i) are found by taking differences between adjacent DL(i) values for said second range of i values to obtain local slope values, ordering the local slope values, taking a window of W ordered values, and finding a median value in the window.

15. A method according to claim 13, wherein:

said finding a second (Q) of said two additional functions further comprises finding an averaged median filtered slope $S_m$ and calculating said Q function as a function of said DL(i) values, said DLm(i) values, and said averaged median filtered slope.

16. A method according to claim 15, wherein:

said averaged median filtered slope $S_m$ is found by taking differences between adjacent ordered DLm(i) values to provide a vector dDLm(i), filtering said vector to exclude at least a smallest value and a largest value in said vector to provide a filtered vector having elements, and taking a mean value of the elements in said filtered vector.

17. A method according to claim 15, wherein:

said second (Q) of said two additional functions is found according to $$Q = \frac{1}{2}\left(\sum_{i=i5}^{i=i6} DL(i) + \sum_{i=i5}^{i=i6} DLm(i)\right) - S_m \frac{Ly^2}{2},$$

where i5 and i6 are i values which define said second range, and Ly=i6−i5−1.

18. A method according to claim 17, wherein:

said second range of i values is from i equals approximately 65 to i equals approximately 80.

19. A method according to claim 7, wherein:

said finding values of at least two additional functions comprises finding a second (Q) of said two additional functions by determining for a second range of i values a plurality of windowed median values of the DL(i) values (DLm(i)) and calculating said Q function as a function of said DL(i) values and said DLm(i) values.

20. A method according to claim 19, wherein:

said using said at least two functions to determine whether said DIL sequence information was last encoded according to A-law or $\mu$-law encoding comprises (i) comparing said first function (Z) to a second threshold Th2, wherein said DIL sequence information is determined to be last encoded according to $\mu$-law encoding if Z is greater than Th2, and (ii) if Z is not greater than Th2, then comparing said second function (Q) to a third threshold Th3, wherein said DIL sequence information is determined to be last encoded according to A-law encoding if Q is less than Th3, and (iii) if Q is not less than Th3, then comparing Z to a first threshold Th1, wherein said DIL sequence information is determined to be last encoded according to $\mu$-law encoding if Z equals Th1.

21. A method according to claim 20, wherein:

said using said at least two functions to determine whether said DIL sequence information was last encoded according to A-law or $\mu$-law encoding further comprises (iv) if z is not equal to Th1, then comparing Q to a fourth threshold Th4, wherein said DIL sequence information is determined to be last encoded according to $\mu$-law encoding if Q is less than Th4, and (v) if Q is not less than Th4, then comparing Q to a fifth threshold Th5, wherein said DIL sequence information is determined to be last encoded according to $\mu$-law encoding if Q is greater than Th5, and is otherwise determined to be last encoded to A-law.

22. A method according to claim 21, wherein:

Th1 is approximately equal to −32767, Th2 is approximately equal to −100, Th3 is approximately equal to 820, Th4 is approximately equal to −200, and Th5 is approximately equal to 250.

* * * * *